United States Patent [19]

Fende et al.

[11] Patent Number: 4,613,989
[45] Date of Patent: Sep. 23, 1986

[54] POLICE RADAR WARNING RECEIVER

[75] Inventors: John R. Fende; Gregory R. Furnish, both of Mason; Richard L. Grimsley, Cincinnati, all of Ohio

[73] Assignee: Cincinnati Microwave, Inc., Cincinnati, Ohio

[21] Appl. No.: 656,026

[22] Filed: Sep. 28, 1984

[51] Int. Cl.[4] ............................................. H04B 1/08
[52] U.S. Cl. .................................. 455/351; 455/328; 455/269; 333/209; 343/786; 343/872
[58] Field of Search ............... 455/269, 280, 281, 328, 455/347, 349, 351; 333/208, 209; 343/18 E, 702, 772, 786, 872

[56] References Cited

U.S. PATENT DOCUMENTS

| | | |
|---|---|---|
| 2,408,055 | 9/1946 | Fiske . |
| 2,414,376 | 1/1947 | Heim . |
| 2,508,918 | 5/1950 | Hines, Jr. . |
| 2,629,865 | 2/1953 | Barker . |
| 2,650,935 | 9/1953 | Rust et al. . |
| 2,832,885 | 4/1958 | Brett . |
| 2,851,686 | 9/1958 | Hagaman . |
| 2,855,257 | 9/1958 | Barker et al. . |
| 3,100,894 | 8/1963 | Giller et al. . |
| 3,395,059 | 7/1968 | Butler et al. . |
| 3,449,698 | 6/1969 | Cooper . |
| 3,512,155 | 5/1970 | Bloice . |
| 3,657,670 | 4/1972 | Kitazume et al. . |
| 3,736,591 | 5/1973 | Rennels et al. . |
| 3,747,109 | 7/1973 | Corbell et al. . |
| 3,899,759 | 8/1975 | Hines et al. . |
| 4,123,756 | 10/1978 | Nagata et al. . |
| 4,195,289 | 3/1980 | Cole . |
| 4,200,870 | 4/1980 | Gabbitas . |
| 4,219,777 | 8/1980 | Richardson . |
| 4,231,038 | 10/1980 | Holford . |
| 4,275,369 | 6/1981 | Sekiguchi . |
| 4,411,022 | 10/1983 | Clifton et al. ........................ 455/328 |
| 4,547,901 | 10/1985 | Shibata et al. ...................... 455/328 |
| 4,571,593 | 2/1986 | Martinson ........................... 343/786 |

FOREIGN PATENT DOCUMENTS

| | | |
|---|---|---|
| 3145386A1 | 5/1983 | Fed. Rep. of Germany . |
| 8624 | 3/1971 | Japan . |
| 139358 | 10/1979 | Japan . |
| 78602 | 6/1980 | Japan . |
| 87965 | 7/1980 | Japan . |
| 979768 | 1/1965 | United Kingdom . |
| 843039 | 6/1981 | U.S.S.R. . |

OTHER PUBLICATIONS

Reference Data for Radio Engineers—p. 23-19.
Foundations for Microwave Engineering, pp. 96, 322-323.
Photographs A-D of the B.E.L.-Tronics Radar Warning Receiver.
"Proven Procedures Guide Cavity VCO Design", *Microwave* (May, 1981).
Microwave Engineer's Handbook, p. 26.
An Antenna from an ESCORT Radar Warning Receiver.
"The Design of Inductive Post-Type Microwave Filters," *Journal Brit. I.R.E.*, May 1958, by M. H. N. Potok.
"Low-Noise 12 GHz Front-End Designs for Direct Satellite Television Reception", *Phillips Technical Review*, vol. 39, 1980, by P. Harrop, P. Lesarte and T. H. A. M. Vlek.
"Rectangular Wageguide Type Variable Band-Pass Filters", IEEE MTT-S International Microwave Symposium Digest, Orlando, FL, Apr. 30-May 2, 1979, S. Toyoda and M. Ozasa.
Prior Art Oscillator described in paper No. 16.
Early ESCORT Radar Warning Receiver Oscillator Section.
Little Marvel the Smart Machine, 1985.

*Primary Examiner*—Jin F. Ng
*Assistant Examiner*—Elissa Seidenglanz
*Attorney, Agent, or Firm*—Wood, Herron & Evans

[57] ABSTRACT

A compact police radar warning receiver is provided having an antenna in which all of the mixer and oscillator components are mounted to one side of the antenna enabling the exterior wall of the side opposite thereto to be constructed substantially flat and thereby function as one of the exterior walls of the housing. The antenna is further provided with an improved microwave oscillator, an impedance transformer and non-adjustably positioned tuning pins.

102 Claims, 5 Drawing Figures

POLICE RADAR WARNING RECEIVER

This invention relates to receivers, and more particularly to receivers which are uniquely adapted to receive police radar signals and warn the user thereof.

A police radar warning receiver is an electronic assembly mountable in a vehicle, such as a passenger car or truck, motorcycle, boat or the like, which travels on land or water in areas subject to speed-monitoring radar surveillance by police, and functions to detect the presence of the police radar and provide the driver or user with an audible and/or visual indication that his speed is being checked by radar.

Typically, a police radar warning receiver includes an antenna, a printed circuit board, the circuitry needed to determine whether the received signal is a police radar signal and to provide appropriate indications and alarms, and a power regulator device which regulates the energy received from a vehicle battery to power the circuitry. These components are located within a box-like housing having four side walls and front and rear end panels. The front panel which, when the receiver is mounted in the vehicle, faces the user, has indicators and control knobs. The rear wall has extending from it a power cord terminating in an appropriately configured plug insertable in the vehicle cigarette lighter socket.

Police radar speed-monitoring units transmit radar signals in either the X-band or the K-band of the frequency spectrum, as discussed in U.S. Pat. No. 4,313,216. Typical radar warning receivers are adapted to detect police radar signals in either band. Accordingly, police radar warning receivers are sometimes referred to as dual frequency radar warning receivers.

One illustrative form of prior art receiver is the ESCORT radar warning receiver currently marketed by the assignee herein, Cincinnati Microwave, Inc. of Cincinnati, Ohio. The ESCORT radar warning receiver contains circuitry permitting it to detect and indicate the presence of both X-band and K-band police radar signals. That circuitry is disclosed in aforesaid U.S. Pat. No. 4,313,216. Briefly, the oscillator generates dual frequency signals which are quasi-harmonically related. These signals mix with the incoming signal and provide output or mixed signal (the IF). The IF signal is evaluated to determine whether a police radar signal is present in which case an alarm is activated. This process is referred to as heterodyning, or super-heterodyning where the IF is mixed again with another local oscillator signal before evaluation.

Improved versions of the circuitry disclosed in U.S. Pat. No. 4,313,216 are described in U.S. Patent Application Ser. No. 575,422, filed Jan. 31, 1984, and U.S. Patent Application Ser. No. 656,029 entitled "Radar Warning Receiver With Mute Function," invented by Richard L. Grimsley, and filed concurrently herewith. Both of the aforesaid patent applications are also assigned to Cincinnati Microwave, Inc.

Police radar warning receivers are relatively costly and, because their popularity has risen, are prime targets for theft. Unfortunately, typical of these receivers is that they are too large to be conveniently portable such as by carrying them about in one's shirt pocket. Hence, the user would typically leave the receiver with the vehicle when not in use. Further, these receivers are not typically permanently mounted to the vehicle. The result is a significant theft problem.

Accordingly, one object of the present invention has been to provide a police radar warning receiver which is compact enough to be easily portable in one's purse or shirt pocket, for example, and yet does not compromise quality, features or function.

To achieve the foregoing object of the invention, the radar warning receiver is provided with an antenna in which all of the oscillator and mixer components are mounted to the top walls of the antenna, enabling the exterior wall of the side opposite thereto (the bottom wall) to be constructed substantially flat and thereby function as one of the exterior walls of the housing, in turn reducing the receiver thickness previously encountered in prior art receivers which required totally separate housing structures throughout. In a preferred embodiment, the antenna includes three sections, a rearward oscillator section, a forward horn section, and a mixer section disposed therebetween. All three section have top, bottom, left, and right walls which cooperate to define respective oscillator, horn, and mixer cavities. Further, the horn section has the greatest height of the three. Accordingly, the receiver's overall height is minimized by providing the microwave horn with a maximum vertical cross-section (from the interior of its top wall to the interior of its confronting bottom wall) no higher than approximately 0.7 inches.

As is true with most products, manufacturers strive to reduce the cost of manufacturing and the complexity of assembly. Accordingly, a further object of the present invention has been to reduce the cost and complexity involved in constructing a police radar warning receiver.

The foregoing objective has been achieved, in part, by the above-mentioned mounting of the mixer and oscillator components to the same side of the antenna. Placement of all the components in this fashion eliminates the need to repeatedly turn the antenna over during assembly either to insert components or to subsequently tune the antenna. Further reduction in cost and complexity has been achieved by formation of cantilever arms integral with the printed circuit board which hold certain of the oscillator and mixer components in place. The cantilever arms eliminate many of the components which would otherwise be utilized merely to hold these oscillator and mixer components in place.

The printed circuit board with integral cantilever arms also makes possible a further reduction in height of the radar warning receiver. Previously, the wall to which the oscillator and mixer components were mounted was relatively thick to cooperate with the fastening components now eliminated by the cantilever arms. Accordingly, the mounting wall thickness has been reduced. As a result, the printed circuit board is mounted closer to the antenna bottom than was previously possible. In the preferred embodiment, the printed circuit board is mounted to the antenna oscillator and mixer sections, and the resultant height is less than the maximum vertical cross-section of the horn. As the horn thus provides the lower limit on the overall height of the receiver, the printed circuit board does not contribute to the height of the receiver.

In tuning the typical police radar warning receivers, both the oscillator and the mixer are tuned. An even further object of the present invention has been to improve the ease of tuning a police radar warning receiver without sacrificing reliability. This object of the invention is achieved, in part, because all of the mixer and oscillator components are on the same side, thus eliminating the need to flip the antenna over to tune it, as previously explained. Further, tuning has been made simpler and more reliable by providing two tuning pins which are non-adjustably positioned through the side of the antenna for projection into the interior of the antenna a predetermined distance. An advantage of such tuning pins is that once they are properly sized for a given desired tuning condition, they can be inserted automatically by machine and further adjustment is not necessary, thus reducing labor costs and improving reliability.

Some police radar warning receivers on the market today are of the heterodyne or super-heterodyne type. As such, they utilize a microwave oscillator. A yet further object of the present invention has been, therefore, to provide a radar warning receiver with an improved microwave oscillator.

The foregoing objective has been achieved by providing a box-shaped oscillator section having a first pair of substantially parallel, confronting inner surfaces and a second pair of substantially parallel, confronting inner surfaces, the latter being perpendicular to the former to define an oscillator cavity. The oscillator section also has a slotted wall perpendicular to the four other walls and positioned at one end of the oscillator section to preferentially permit only a portion of the oscillator generated microwave signals to pass out of the oscillator cavity, whereby oscillation can be maintained in the oscillator cavity. The slotted wall also forms the rear wall of the mixer section.

The oscillator further includes a Gunn diode having a central axis and being mounted within the oscillator cavity. The Gunn diode central axis is equidistant from both the second pair of inner surfaces and is spaced rearwardly of the slotted wall a predetermined distance L. The second pair of inner surfaces are spaced apart a predetermined distance W as determined by the formula:

$$f_o = C \left[ \frac{\sqrt{W^2 + L^2}}{2WL} \right]$$

wherein
C = velocity of light;
L > W; and
12.0 Ghz < $f_o$ < 12.5 Ghz.

In a preferred embodiment, L is 0.755 inches and W is 0.627 inches.

The oscillator also includes a dielectric tuning rod having a central axis and being selectively projectable into the oscillator. The central axis of the rod is spaced rearwardly of the slotted wall a predetermined distance $T_1$ and a predetermined distance $T_2$ away from a selected one of the second pair of inner surfaces wherein:

0.420 inches < $T_1$ < 0.480 inches;

and

W/2 − 0.030 inches < $T_2$ < W/2 + 0.030 inches.

In the preferred embodiment, $T_1$ is 0.450 inches and $T_2$ is approximately equal to W/2. Also, the rod is preferably comprised of alumina.

The slotted wall preferably includes an iris having a predetermined width WI and a predetermined height HI, the iris being centered in the slotted wall. In order to sweep the oscillator as required for a radar warning receiver, the oscillator prefered comprises a varactor diode having a central axis and being mounted within the oscillator cavity. The central axis of the varactor diode is spaced rearwardly a predetermined distance $V_1$ from the slotted wall and spaced from a selected one of the second pair of inner surfaces of a predetermined distance $V_2$ as determined by the equation:

$$K = \sin^2\left(\frac{V_1 \pi}{L}\right) \sin^2\left(\frac{V_2 \pi}{W}\right)$$

wherein 0.11 < K < 0.27;

$V_1$ < $T_1$; and $$V_2 < \left(\frac{W}{2} - \frac{WI}{2}\right).$$

In the preferred embodiment, $V_1$ is 0.240 inches and $V_2$ is 0.103 inches. The first pair of inner surfaces correspond to the interior surfaces of the top and bottom walls of the oscillator section of the antenna.

A problem encountered in making a more compact police radar warning receiver is the loss of sensitivity inherent in reducing the size of the horn section. Accordingly, a still further object of the invention has been to minimize the loss of sensitivity in a compact police radar warning receiver.

This objective has been accomplished by providing an impedance transformer mounted to at least a portion of the top and bottom wall inner surfaces of the mixer and horn sections for providing a substantially smooth impedance transformation from the free-space impedance of a plane wave at the horn aperture to the propagation mode impedance at the mixer diode mounted within the mixer cavity forward of the slotted wall.

In a preferred embodiment, the impedance transformer comprises a pair of spaced apart confronting ridges, each ridge being integral and projecting inwardly from a respective top or bottom wall inner surface. The ridges have a lengthwise central axis being located equidistantly from the left and right wall inner surfaces of the horn and mixer sections, and have a gap therebetween. The mixer diode has a central axis which is equidistant from the left and right mixer wall inner surfaces whereby the mixer diode central axis intersects both the confronting ridges through their lengthwise central axes.

In the preferred embodiment, the horn aperture is 2.00 inches forwardly of the mixer diode. The gap is 0.050 inches at the mixer diode and the gap increases continuously, logarithmically to form a log taper wherein the gap is 0.433 inches at 1.30 inches forward of the mixer diode. Further, the confronting ridges are each preferably 0.133 inches wide.

The several objectives and features of the present invention will become more readily apparent from the following detailed description taken with the accompanying drawings wherein like reference numerals apply to like structure and in which.

GENERAL DESCRIPTION OF THE RADAR WARNING RECEIVER

Figure 1:
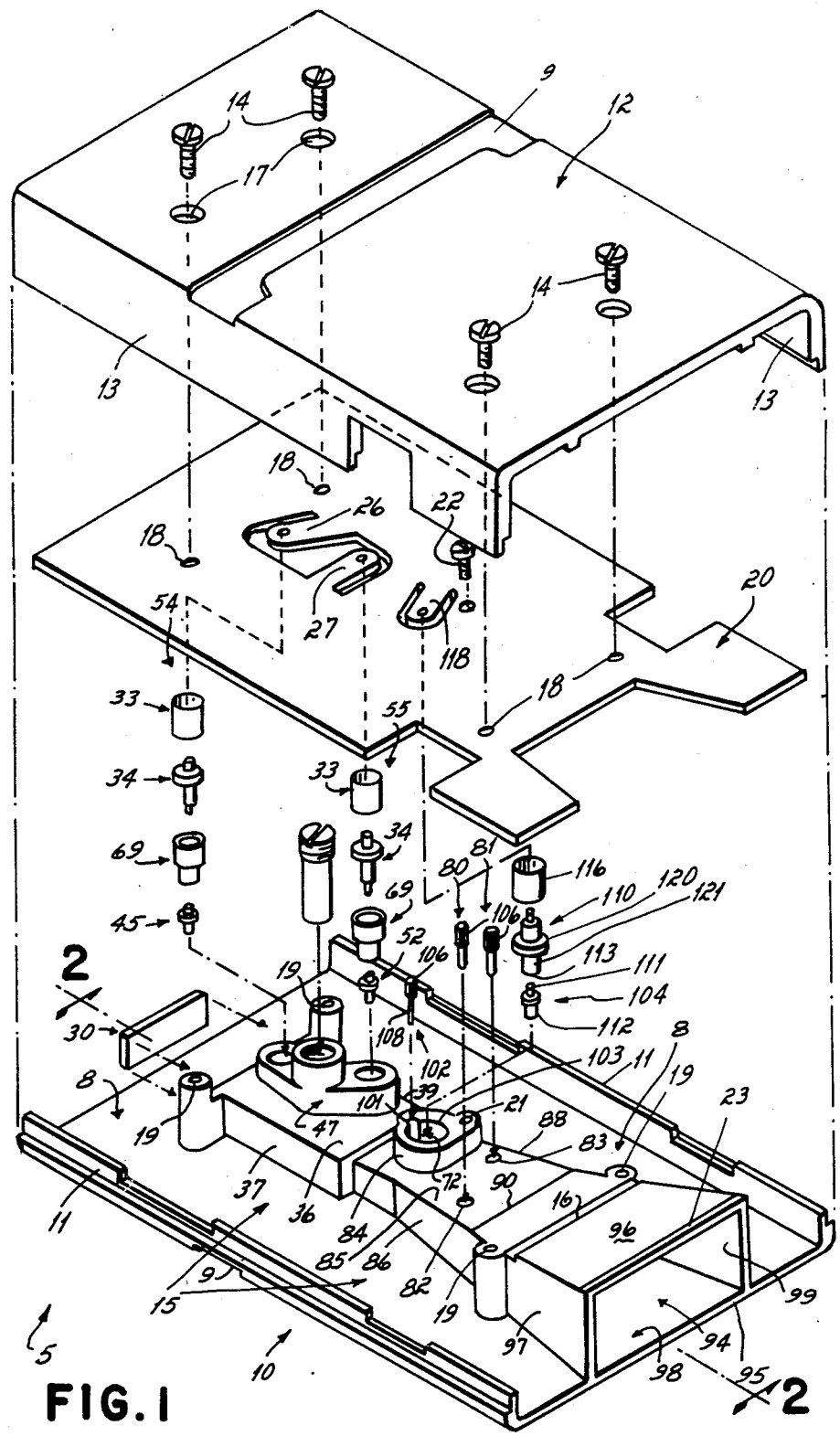
FIG. 1 is an exploded, isometric view of a preferred embodiment of a radar warning receiver of the present invention.

With reference to FIG. 1, there is disclosed the radar warning receiver 5 of the present invention.

Radar warning receiver 5 is comprised of two housing sections 10, 12, a single cast, integral aluminum antenna 15 formed integrally with aluminum bottom housing section 10, and printed circuit board 20 to which is mounted most of the associated circuitry (not shown) to make receiver 5 operable. Such circuitry is disclosed in the aforesaid U.S. Pat. No. 4,313,216, U.S. application Ser. No. 575,422 filed Jan. 31, 1984, and U.S. Patent Application Ser. No. 656,029, in the name of Richard L. Grimsley, entitled "Police Radar Warning Receiver With Mute Function" filed concurrently herewith. The disclosures of the foregoing patent and applications are all incorporated herein by reference.

Radar warning receiver 5 further includes a plurality of oscillator and mixer components which are mounted directly to antenna 15 as will be discussed. The front and rear panels, switches, indicators and jacks have been deleted to facilitate discussion. A completely assembled radar warning receiver as shown in FIG. 1 is disclosed in concurrently filed U.S.Design Patent Application Ser. No. 655,867, entitled "Police Radar Warning Receiver" invented by Robert E. Dilgard, Jr., and assigned to Cincinnati Microwave, Inc. That disclosure is incorporated herein by reference.

Receiver 5 is assembled by placing the necessary components into the antenna 15 (as will be discussed), mounting board 20 over antenna 15 until it rests over the components and on shelf 16 of antenna 15. Board 20 is held to antenna 15 by screw 22 as at 21. Housing sections 10 and 20 are mated together such that their mating lips 11, 11 and 13, 13 abut each other. Top 12 is secured to bottom 10 by screws 14 which are received through housing section 12 as at 17, through board 20 as at 18, and received in housing section 10 as at 19. When assembled, part of the interior of housing top 12 rests on ledge 23 formed at the forwardmost end of antenna 15. Ledge 23 is spaced from bottom 10 further than any other portion of antenna 15, thereby placing a lower limit on the height of receiver 5 when assembled.

Because antenna 15 is formed integral with bottom housing section 10, there is no assembly needed to mount antenna 15 to housing 10.

DETAILED DESCRIPTION OF THE RADAR WARNING RECEIVER

Single cast, integral antenna 15 includes a rearward oscillator section 25, a forward horn section 31, and a mixer section 28 disposed therebetween.

Oscillator section 25 has mounted to it a variety of oscillator components which are mounted to, or through, its top wall 36. It is to be understood herein that when the term "mounted to" is used, it is meant to connote that the item is either physically in contact therewith or that by cooperation with other parts which do make physical contact therewith, the item is inserted therethrough and held in place by those other parts. Thus, Gunn diode 45 which is within oscillator cavity 40 is mounted to top wall 36 inasmuch as diode 45 is insertable through hole 46 and is held in place by a variety of parts, as will be discussed, which do contact mounting wall 47 which is integral to and thus part of the exterior of top wall 36.

Mixer section 28 also has mounted to it a variety of components. Further, mixer section 28 and horn section 31 are provided with impedance transformation ridges 91, 92.

Each section 25, 28, 31 of antenna 15 has at least four walls referred to herein as top, bottom, left and right walls. Those walls cooperate to define a respective section cavity as will be discussed herein. Oscillator section 25 has top wall 36, a left wall 37, a bottom wall 38 and a right wall 39 which cooperate to define the oscillator cavity 40 referred to above. Mixer section 28 similarly has a top wall 85, a left wall 86, bottom wall 87 and right wall 88 which cooperate to define a mixer cavity 89. Finally, horn section 31 has a top wall 96, a left wall 97, a bottom wall 98, and a right wall 99 cooperating to define a horn cavity 94.

As mentioned earlier, all of the oscillator components are mounted to top wall 36 of oscillator section 25 through mounting wall 47 while all of the mixer components are mounted to top wall 85 of mixer section 28 through mounting wall 84. By placing all of these components on the same side of the antenna, it has become possible to make the antenna 15 integral to housing section 10 to advantageously reduce the lheight of the radar warning receiver. To that end, the outer or exterior surfaces of bottom walls 37, 87 and 98 are substantially smooth and flat and cooperate to define a plane. Additionally, antenna 15 includes an integral lateral extension 8 extending to the left, right and rear of antenna 15. Extension 8 has a substantially flat outer surface lying in the plane defined by the bottom walls of the antenna. Thus, extension 8 cooperates with the antenna bottom walls to form part of housing section 10.Extension 8 is provided with lips 11, 11 along its right and left peripheries which mate with lips 13, 13 of housing section 12 to form housing sidewalls.

When joined together, the upper surface of housing section 12 is substantially parallel to the lower surface of housing section 10. Both are preferably provided with indented finger and thumb grips 9, 9. It is to be understood that the exterior surface of the antenna bottom walls are still considered smooth and flat and are considered to cooperate to substantially define a plane despite the presence of grip 9 therein.

Figure 2:
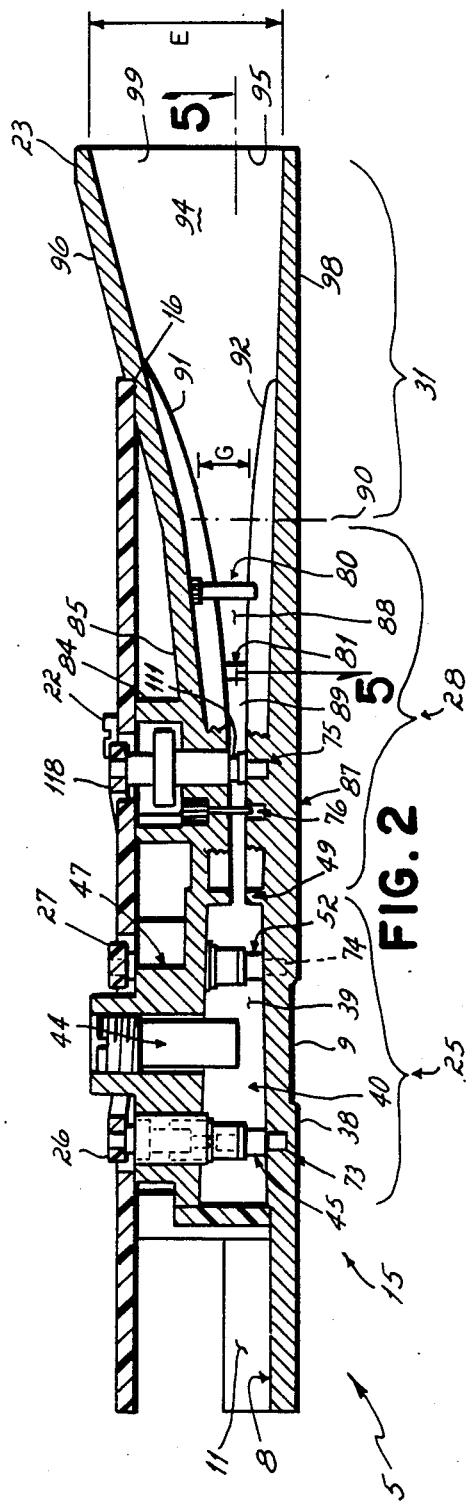
FIG. 2 is a non-exploded, cross-sectional view of the radar warning receiver of FIG. 1, taken along line 2—2, but without the housing top.

As seen in FIG. 2, the interior cavity-facing surfaces of bottom walls 38, 87 and 98 are also substantially flat, with the exception of the mounting depressions or the ridges to be discussed below, and thus cooperate to define a plane. This inner bottom wall plane is preferably parallel to the exterior bottom wall plane previously discussed. In actual practice, the inner bottom wall plane is not truly parallel to the exterior plane because of manufacturing processes involved in casting, resulting in a draft affect.

The walls of antenna 15 must diverge from each other to permit the casting cores to be easily pulled from the oscillator section and the mixer and horn sections resulting in thicker bottom walls near wall 49 than spaced away from wall 49. For example, bottom wall 87 of mixer section 28 is 0.098 inches thick adjacent to slotted wall 49; at the interface 90 of mixer section 28 and horn section 31, the thickness of the bottom wall is 0.069 inches; and at the aperture 95 of horn 31, bottom wall 98 is 0.040 inches thick. Similarly, bottom wall 38 is 0.098 inches thick at wall 49 and 0.085 inches thick at the rearward end of section 25 at wall 30.

The bottom walls 38, 87, 98 are advantageously as thin as possible while still providing structural support for receiver 5. The spacing between the top and lower walls generally affects operation of antenna 15. Thus, the thinner the bottom walls, the closer the top walls can be to the exterior of the bottom walls to provide a slim, compact receiver 5.

Another result of the draft provided during casting is that walls whose inner surfaces are preferably parallel will diverge slightly. Accordingly, as used herein, the term substantially parallel indicates that parallelism is satisfied where, but for the minor divergence induced by draft, the surfaces or planes would be parallel. For example, the inner surfaces of walls 36 and 38 are preferably parallel and spaced apart 0.195 inches. However, due to draft, they are spaced apart 0.185 inches adjacent wall 49 and 0.210 inches adjacent wall 30.

DETAILED DESCRIPTION OF OSCILLATOR 25

Oscillator section 25 has a box-shaped cavity 40 defined by the substantially smooth, flat inner cavity-facing surfaces of walls 36, 37, 38 and 39. The inner surfaces of spaced apart walls 36 and 38 are substantially parallel whereas the inner surfaces of spaced apart walls 37 and 39 are similarly substantially parallel to one another but substantially perpendicular to the inner surfaces of walls 36 and 38. Oscillator section 25 also includes forward slotted wall 49 which forms the rearward wall of mixer 28. Forward wall 49 substantially closes off cavity 40 thereby keeping sufficient energy within cavity 40 to sustain oscillations. Wall 49 is also provided with a centered and oval-shaped iris 50 to permit some of the oscillator energy to escape into mixer cavity 89.

Top wall 36 is provided with an integral mounting wall 47 through which are mounted the oscillator components: gallium arsenide Gunn diode 45; gallium arsenide varactor diode 52, folded chokes 54, 55 and tuning rod 44.

Each of the chokes 54, 55 have diode mounts 57, 58 at their lower extremities in which are inserted anode 60 and cathode 61 of diodes 45 and 52, respectively. Cathode 62 and anode 63 of diodes 45 and 52, respectively, are received in mounting depressions 73 and 74, respectively, formed in bottom wall 38. The barrels 65, 66 of chokes 54, 55, respectively, are mounted within cavity 40 and are 0.125 inches in diameter.

To mount these components to wall 36, diode 45 and choke 54 are inserted through mounting hole 46 and diode 52 and choke 55 are inserted through mounting hole 53.

Once printed circuit board 20 is secured over antenna 15, downward pressure from cantilevered arms 26 and 27 hold chokes 54, 55 against diodes 45, 52, thereby keeping the diodes mounted securely to top wall 36.

Diodes 45 and 52 are "post coupled". Folded chokes 54, 55 provide a DC short circuit and an AC inductive coupling between the anode 60 and the cathode 61 of their respective mating diodes 45, 52 and the associated operating circuitry (not shown) of receiver 5. Chokes 54, 55 also capacitively couple the anode 60 and the cathode 61 to the walls of oscillator 25. To insulate them from DC electrical contact with the oscillator walls and to hold their respective silver-plated hard brass components (68, 69) together, chokes 54, 55 are provided with heatshrinkable sleeves 33. As shown in FIG. 2, sleeves 33 are heat shrunk around chokes 54, 55 to conform to their shape. The sleeves extend from above the shoulder 34 of top pieces 68 to just below the ledge 35 of bottom pieces 69, respectively.

Tuning rod 44, which has a threaded brass top 42 and a cylindrical alumina body 43 is received through threaded mounting hole 41 and can be adjusted to project into cavity 40 the desired distance to tune oscillator 25.

An important advantage of this invention is that improved operating characteristics are obtained by placing the oscillator components in specific relationship to each other and to the walls of oscillator 25.

To precisely identify the location of the oscillator components reference is had to the central or vertical axis 68' of diode 45, central axis 70 of diode 52, and central axis 69 of tuning rod 44.

Electrically, cavity 40 includes the volume between slotted wall 49 and a parallel plane 51 which intersects central axis 68', between the inner surfaces of walls 37 and 39, and between the inner surfaces of walls 36 and 38. Central axis 68' is equidistant from the inner surface of both walls 37 and 39 and thus lies along the longitudinal axis 24 of section 25 (as well as antenna 15). The distance L from wall 49 to central axis 68' is determined in relation to the distance W between the inner surfaces of walls 37 and 39 by the formula:

$$f_o = C\left[\frac{\sqrt{W^2 + L^2}}{2WL}\right]$$

wherein L>W; C=velocity of light, and 12.0 GHz < $f_o$ < 12.5 GHz. Preferably 0.705 inches < L < 0.805 inches. In the preferred embodiment, L is 0.755 inches and W is 0.627 inches. As discussed earlier with respect to the draft due to casting antenna 15, distance W actually varies from 0.614 inches adjacent front wall 49 to 0.640 inches behind plane 51. Thus, the value of 0.627 inches for W is an average value but it should be understood that use of that number comprehends the variation over the length L which is due to the draft in casting antenna 15.

Cemented to the rear end of oscillator 25 is preferably a ferrite wall 30. Wall 30 is spaced rearwardly from diode 45 0.200 inches. Indeed, wall 30 could be eliminated although it improves oscillator 25 by suppressing certain undesirable signals such as the 17 GHz mode.

The location of varactor diode 52 and tuner 44, central axes 70 and 69, respectively, are to be determined in relation to L and W.

As previously mentioned, $f_o$ is in the range of 12 GHz to 12.5 GHz which is somewhat above the nominal local oscillator frequency of 11.55 GHz as discussed in U.S. Pat. No. 4,313,216, which has been incorporated herein by reference. However, the specific dimensional relationships in oscillator section 25 are selected to permit diode 45 to oscillate prior to tuning at a frequency above the desired local oscillator (LO) frequency so as to maintain desirable temperature characteristics, power output, tuning range, and sweep range necessary to proper operation of a radar warning receiver, yet not so far above the desired LO frequency that it is not within a range in which tuning rod 44 can cause oscillations to be tuned to the LO frequency.

Accordingly, central axis 69 is spaced rearwardly of wall 49 a distance $T_1$, which must be greater than L/2 and is preferably 0.450 inches plus or minus 0.030 inches. Central axis 69 is also spaced to the left of the inner surface of right wall 39 a predetermined distance which is approximately W/2 plus or minus 0.030 inches. Tuner 44 can be slightly offset from the center of longitudinal axis of oscillator 25 and it is believed that that offset may even enhance the operation and tunability of the oscillator.

Central axis 70 of varactor diode 52 is spaced a distance $V_1$ from slotted wall 49 and a distance $V_2$ from the inner surface of right wall 39. Distances $V_1$ and $V_2$ are determined by the formula:

$$K = \sin^2\left(\frac{V_1 \pi}{L}\right) \sin^2\left(\frac{V_2 \pi}{W}\right)$$

K is preferably held to a range between 0.11 and 0.27. As K increases, the sweep range of the oscillator may increase to an unacceptably large range whereas as K decreases, the sweep range may not be large enough. Accordingly, it has been determined that the range of 0.11 to 0.27 would produce a good cavity 40 within which to maintain appropriate oscillations over the appropriate sweep range. Additionally, $V_1$ must be less than $T_1$, is preferably <0.38 inches and is, more preferably, 0.240 inches.

$V_2$ must be a value which will preclude placing varactor diode 52 near or on the longitudinal axis 24 of oscillator 25 so as not to be placed between the energy path from Gunn diode 45 to and through iris 50 in slotted wall 49. Iris 50 is centered in slotted wall 49, has a height HI of 0.040 inches and a width WI of 0.218 inches. In view of the location and width of iris 50, $V_2 \leq 0.154$ inches and is preferably 0.103 inches. $V_1$ and $V_2$ also have practical lower limits due to the diameter of varactor diode 52 as well as the diameter of choke 55 as is well understood.

In operation, when electrical potential is applied to choke 54, Gunn diode 45 will tend to oscillate somewhere in the 12 GHz to 12.5 GHz range. By adjusting tuning rod 44 into or out of cavity 40, the actual frequency of oscillation within oscillator cavity 40 can be adjusted to a range appropriate for operation as discussed in U.S. Pat. No. 4,313,216. To affect sweeping to operate the receiver as is further discussed in U.S. Pat. No. 4,313,216, varying electrical potential is provided to varactor diode 52 through choke 55. As a result, the capacitive effect of diode 52 will vary thereby changing the frequency of oscillations within cavity 40.

Oscillator 25 is disclosed in concurrently filed U.S. patent application Ser. No. 656,023, entitled "Microwave Oscillator," invented by John R. Fende, assigned to Cincinnati Microwave, Inc., the disclosure of which is incorporated herein by reference.

DETAILED DESCRIPTION OF THE MIXER COMPONENTS

Mixer section 28 is provided with mounting wall 84 and slots 82, 83 to receive the mixer components which are mounted to mixer top wall 85. Mounted to integral mounting wall 84 is metal tuning rod 102, mixer diode 104 and choke 110. Inserted through slots 82, 83 are metal pins 80, 81, respectively. Tuner 102, diode 104 and choke 110 are positioned in front of iris 50 and between the inner surfaces of walls 86, 88. Tuner 102 is received in bore 101 which overlaps into mounting hole 103 through which diode 104 and choke 110 are inserted. Tuner 102 has a splined top 106 and a needle nose 108 which can project into mounting depression 76. Tuner 102 is inserted to an appropriate depth into cavity 89 to tune the mixer and the splines 106 will frictionally engage the walls of bore 101. Alternatively, tuner 102 could have a threaded top 106 and bore 101 could be similarly threaded to permit tuning of tuner 102. The former is preferred as tuning is maintained once tuner 102 is positioned. The latter would require an additional locking washer to keep tuner 102 from changing its factory installed setting.

Cathode 112 of diode 104 is received in mounting depression 75 formed in ridge 92. Diode 104 is also "post coupled". Anode 111 of diode 104 is received in mating diode mount 113 in the underside of silver-plated hard brass choke 110. Barrel 121 of choke 110 is 0.085 inches in diameter and partially within mixer cavity 89. Choke 110, although only a single piece, thus functions much like chokes 54 and 55 and is similarly insulated with heat shrinkable sleeve 116 extending from above shoulder 120 to the bottom of barrel 121. Once inserted, and board 20 attached, diode 104 is held in place by the downward force applied to choke 110 by cantilever arm 118.

Pins 80, 81 are inserted through slots 82, 83, respectively, and are frictionally held therein by engagement of the splined tops 106 with the edges of slots 82, 83. Slots 82, 83 are located to provide a notch filter at the image frequency (12.58 GHz) and at the LO frequency (11.55 GHz), respectively. It has been discovered that pins 80, 81 can be inserted to fixed distances relative to the inner surface of bottom wall 87 and therefore need not be tunable. Hence, pins 80, 81 can be automatically inserted by a machine thus eliminating certain labor costs and improving reliability. Preferably, pin 80 is inserted to within 0.074 to 0.083 inches of the inner surface of wall 87 to have a resonant frequency at the image frequency. Similarly, pin 81 is inserted to within 0.035 to 0.038 inches of the inner surface of wall 87 to have a resonant frequency at the LO frequency. Also, slots 82 and 83 are preferably situated 0.575 inches and 0.310 inches forwardly of a mixer plane 71. Mixer plane 71 contains the central axis 72 of mixer diode 104 and is parallel to wall 49. Slots 82 and 83 are also situated 0.215 inches to the left and 0.183 inches to the right, respectively, of the longitudinal axis of antenna 15.

DETAILED DESCRIPTION OF THE MIXER AND HORN SECTIONS INCLUDING THE IMPEDANCE TRANSFORMER

Mixer section 28 and horn section 31 meet as at 90 to define an interface plane 90 which is parallel to wall 49. Similarly, horn section 31 terminates at its forward end as at 95 to define an aperture plane 95, also parallel to wall 49. The distance from interface plane 90 to aperture plane 95 is 1.20 inches. Similarly, the distance from wall 49 to plane 90 is 1.20 inches.

An important advantage of the present invention is that receiver 5 is approximately the size of a standard audio cassette box, or about 0.75 inches high, about 4 inches long and about 2.7 inches wide. Others who have attempted to make a radar warning receiver within these constraints have generally not succeeded. One reason may be the inability to shrink the size of the horn section 31 while still maintaining adequate sensitivity.

In the horn 31 of the present invention, the mouth or aperture 95, which has the largest vertical cross-section of the receiver antenna 15, is of sufficiently small vertical cross-section to achieve the desired compactness of receiver 5. Specifically, the maximum height from the exterior of top wall 96 to the exterior of bottom wall 98 is approximately 0.7 inches. Also, the maximum distance from left wall 97 to right wall 99 is about 1.2 inches. The small cross-section at aperture 95 limits the sensitivity of antenna 15 but the dimensions of horn and mixer cavities 94 and 89, respectively, and the dimensions of ridges 91 and 92 minimize the impact of that limited sensitivity. Specifically, the above dimensions are selected so as to provide a relatively smooth transition from the free space impedance of a plane wave (approximately 377 ohms) at aperture 95 to the lower mixer mode impedance at the mixer plane 71 in an effort to minimize losses as the signals traverse through the antenna.

The impedance transformer includes ridges 91, 92. Preferably, ridges 91, 92 should not extend to aperture 95 as the wave pattern thereat might be distorted. Inasmuch as the mixer and horn are premised on receiving an undistorted wave, the operating parameters of antenna 15 could be different than expected. For example, the theoretical distortion could result in further loss of sensitivity of antenna 15. Accordingly, ridges 91, 92 extend from wall 49 forwardly to 1.30 inches forward of mixer plane 71; 0.70 inches rearward of aperture 95. At that point, ridges 91, 92 merge with horn walls 96, 98, respectively. The electrically active portion of ridges 91, 92 is from mixer plane 71 to the termination of the ridges in horn section 31.

With reference to FIG. 2, ridges 91, 92 have a gap therebetween. Gap G is a minimum 0.050 inches at mixer plane 71 and expands logarithmically and continuously to 0.433 inches 1.30 inches forwardly of that plane. At that point, the distance E from the inner surface of top wall 96 to the inner surface of wall 98 is also 0.433 inches in which case ridges 91 and 92 terminate, 0.70 inches rearwardly of aperture 95. Ridges 91 and 92 extend rearwardly of mixer plane 71 and, due to draft, gap G will decrease, but to no less than the width of iris 50, or 0.040 inches.

The lengthwise central axes of spaced-apart confronting ridges 91 and 92 are equidistant from the inner surface of the left and right walls 86, 88 and 97, 99 of the mixer and horn sections, respectively. Ridges 91, 92 are each preferably nominally 0.133 inches wide (referred to as S).

Figure 5:
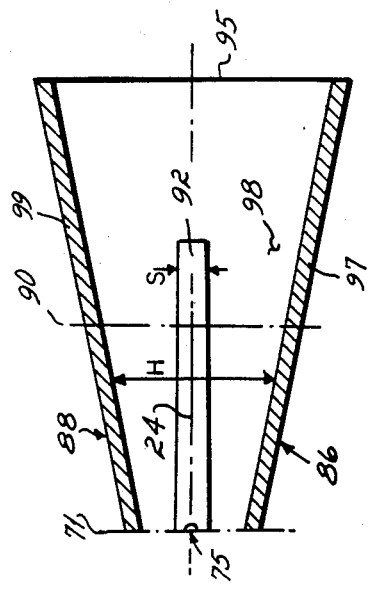
FIG. 5 is a cross-sectional view of the horn and mixer sections of the radar warning receiver of FIG. 1, taken along line 5—5 of FIG. 2.
Figure 4:
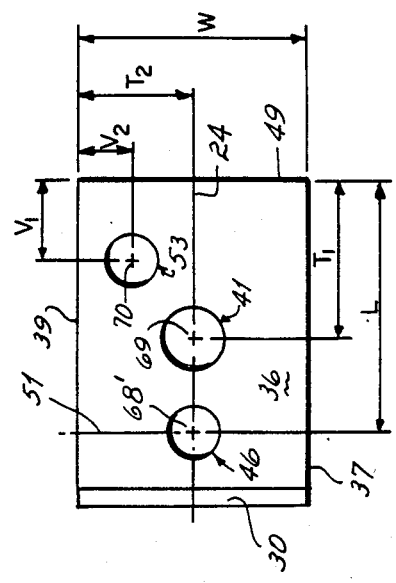
FIG. 4 is a top plan view of the oscillator section of FIG. 3.
Figure 3:
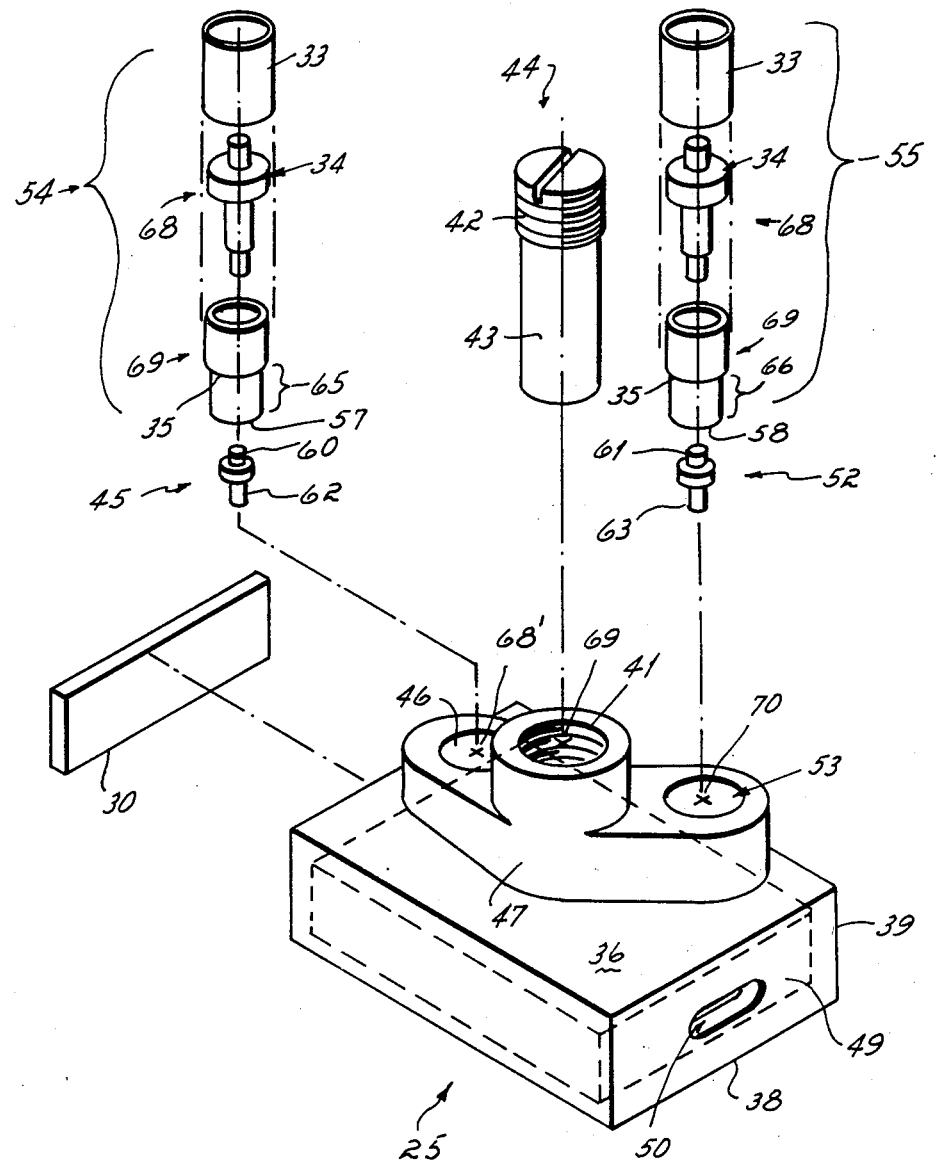
FIG. 3 is an exploded, isometric view of the oscillator section of the radar warning receiver of FIG. 1.

The distance H between the inner surfaces of left and right walls 86, 88 and 97, 99 is seen in FIG. 5. At mixer plane 71, H is 0.450 inches. The walls diverge uniformly and continuously at equal but opposite slopes to 1.240 inches at plane 95.

The distance E between the inner surface of top wall 85 and bottom wall 87 is 0.196 inches at mixer plane 68. Top wall 85 diverges uniformly and continuously from bottom wall 87 so that they are 0.300 inches apart at interface 90. Similarly, with respect to horn section 31, top wall 96 diverges uniformly and continuously from bottom wall 98 so that they are 0.620 inches at aperture 95. As seen in FIG. 2, top walls 85 and 96 diverge from a plane parallel to bottom walls 87 and 98, respectively.

With the foregoing physical dimensions of mixer section 28 and horn section 31, the $TE_{10}$ cutoff frequency of the impedance transformer is well below 8 GHz and thus well below the X-band minimum frequency range in which the antenna is expected to operate.

The following table provides further detail as regards the physical dimensions of the mixer and horn sections where x is measured from mixer plane 71. Note that S is not constant due to the effects of draft.

| x (in.) | H | E | G | S |
|---|---|---|---|---|
| 0 | .450 | .196 | .050 | .140 |
| .2 | .529 | .222 | .064 | .138 |
| .4 | .608 | .248 | .084 | .135 |
| .6 | .687 | .274 | .113 | .133 |
| .8 | .766 | .300 | .158 | .131 |
| 1.0 | .845 | .353 | .220 | .128 |
| 1.2 | .924 | .407 | .328 | .126 |
| 1.3 | .964 | .433 | .433 | .125 |
| 2.0 | 1.24 | .62 | N/A | N/A |

When receiver 5 is constructed as shown herein, all of the necessary mixer and oscillator components in antenna 15 are mounted to the same side. Thus, as can be seen in FIG. 2, none of the antenna's components can be accessed along the bottom walls thereof thereby eliminating the necessity to turn antenna 15 over during the installation of the components and/or during the tuning thereof. Similarly, because antenna 15 is formed integral with part of the housing, certain manufacturing steps employed to house antennas in prior art radar warning receivers in such a way as to prevent easy access to the antenna components by consumers, are eliminated thereby resulting in a savings of manpower.

With respect to FIG. 2, antenna 15 is shown in combination with printed circuit board 20 showing how the chokes and diodes are mounted to top walls 36 and 85, respectively, of the oscillator and mixer sections and yet are retained in place by the action of cantilevered arms 26, 27, and 118 rather than by additional grommets and lock washers, for example, which might otherwise be used to hold those components in place. The ESCORT radar warning receiver (not shown) currently being commercialized utilizes such grommets and lock washers. Cantilever arms 26, 27, and 118 are integrally formed in board 20.

By use of the foregoing antenna 10, a greatly reduced sized radar warning receiver has been produced which has operating characteristics substantially rivaling those of the ESCORT radar warning receiver.

The receiver 5 is provided with a suitable power regulator (not shown) to regulate the battery energy from a vehicle (not shown) to provide the appropriate voltage level to the circuitry of receiver 5. In a preferred embodiment, the power regulator is off-board and contained within the power plug as described in concurrently filed U.S. patent application Ser. No. 656,157, entitled "Radar Warning Receiver With Power Plug" invented by Richard L. Grimsley, and Gregory R. Furnish assigned to Cincinnati Microwave, Inc., the disclosure of which is incorporated herein by reference.

Having described the invention, what is claimed is:
1. A microwave apparatus, comprising:
an electrically conductive structure dimensioned and shaped to receive microwave signals, said structure having a bottom wall, a rearwardly positioned microwave oscillator section, a forwardly positioned microwave horn section, and a microwave section disposed therebetween, each said section having a top wall confronting a portion of said bottom wall and having confronting left and right walls to define respective microwave oscillator, horn and mixer cavities, each said wall having an inner, cavity-facing surface and an outer surface;

at least a portion of said bottom wall outer surface defining a portion of one side of a multi-sided housing adpated to enclose said top, left and right walls of said cavities.

2. The microwave apparatus of claim 1 further comprising:
first mounting means in said oscillator section top wall for mounting tunable microwave oscillator circuitry for projection into said oscillator cavity, and second mounting means in said mixer section topwall for mounting microwave mixer circuitry for projection into said mixer cavity, said outer surface of said bottom wall being free of circuitry and mounting means therefor.

3. The microwave apparatus of claim 2 further comprising a circuit board overlying at least a portion of the oscillator section top wall, cantilever means formed integral with said circuit board, said cantilever means adapted to bear downwardly towards said oscillator section mounting means for maintaining circuitry in said oscillator section mounting means.

4. The microwave apparatus of claim 2 further comprising a circuit board overlying at least a portion of the mixer section top wall, cantilever means formed integral with said circuit board, said cantilever means adapted to bear downwardly towards said mixer section mounting means for maintaining circuitry in said mixer section mounting means.

5. The microwave apparatus of claim 2 wherein said portion of one side of a multi-sided housing is further adapted to enclose said circuitry.

6. The microwave apparatus of claim 2 wherein said bottom wall outer surface substantially defines a first plane, said apparatus further comprising a lateral extension having an outer surface lying substantially in said first plane and defining a second portion of said one side of said multi-sided housing adapted to enclose said top, left and right walls and said circuitry.

7. The microwave apparatus of claim 6 wherein said lateral extension is integral with a portion of said bottom wall.

8. The microwave apparatus of claim 7 wherein said structure is a unitary, integral metal structure.

9. The microwave apparatus of claim 7 wherein said inner cavity-facing surfaces are substantially smooth and flat.

10. The microwave apparatus of claim 1 wherein said bottom wall outer surface substantially defines a first plane, said apparatus further comprising a lateral extension having an outer surface lying substantially in said first plane and defining a second portion of one side of a multi-sided housing adapted to enclose said top, left and right walls.

11. The microwave apparatus of claim 10 wherein said lateral extension is integral with a portion of said bottom wall.

12. The microwave apparatus of claim 11 wherein said structure is a unitary, integral metal structure.

13. The microwave apparatus of claim 11 wherein said inner cavity-facing surfaces are substantially smooth and flat.

14. A police radar warning receiver, comprising:
a microwave antenna adapted to receive a police microwave radar signal, said antenna comprising an electrically conductive structure dimensioned and shaped to receive microwave signals, said structure having a bottom wall, a rearwardly positioned microwave oscillator section, a forwardly positioned microwave horn section, and a microwave mixer section disposed therebetween, each said section having a first pair of confronting, spaced apart walls, one being a top wall the other being a portion of said bottom wall, and a second pair of confronting, spaced apart left and right walls perpendicular to said first pair of walls to define respective microwave oscillator, horn and mixer cavities, each said wall having an inner cavity-facing surface and an outer surface;

operating circuitry including tunable microwave oscillator means and microwave mixer means mounted to one said wall of said oscillator section and said mixer section, respectively, said tunable microwave oscillator means projecting into said oscillator cavity for generating a local microwave oscillator signal, said microwave mixer means projecting into said mixer cavity for mixing a received police microwave radar signal with said local microwave oscillator signal to produce an output signal; and a multi-sided housing enclosing said cavities and said operating circuitry, said bottom wall outer surface defining a portion of the exterior surfaces of one side of said multi-sided housing.

15. The police radar warning receiver of claim 14 wherein said tunable microwave oscillator means and said microwave mixer means are each mounted to said top wall of said oscillator section and said mixer section, respectively.

16. The police radar warning receiver of claim 15 wherein said structure is a unitary, integral metal structure.

17. The police radar warning receiver of claim 15 wherein said inner cavity-facing surfaces are substantially smooth and flat.

18. The police radar warning receiver of claim 15 further comprising a circuit board overlying at least a portion of the mixer section top wall, cantilever means formed integral with said circuit board, said cantilever means adapted to bear towards said mixer section top wall for maintaining at least a portion of said microwave mixer means mounted to said mixer section top wall.

19. The police radar warning receiver of claim 15 further comprising a circuit board overlying at least a portion of the oscillator section top wall, cantilever means formed integral with said circuit board, said cantilever means adapted to bear towards said oscillator section top wall for maintaining at least a portion of said tunable microwave oscillator means mounted to said oscillator section top wall.

20. The police radar warning receiver of claim 14 further comprising a circuit board overlying at least a portion of the mixer section wall to which said microwave mixer means is mounted, cantilever means formed integral with said circuit board, said cantilever means adapted to bear towards said mixer section wall to which said microwave mixer means is mounted, for maintaining at least a portion of said microwave mixer means mounted to said mixer section wall.

21. The police radar warning receiver of claim 14 further comprising a circuit board overlying at least a portion of the oscillator section wall to which said tunable microwave oscillator means is mounted, cantilever means formed integral with said circuit board, said cantilever means adapted to bear towards said oscillator section wall to which said tunable microwave oscillator means is mounted, for maintaining at least a portion of said tunable microwave oscillator means mounted to said oscillator section wall.

22. The police radar warning receiver of claim 14 wherein said bottom wall outer surface and said one housing side are integral.

23. The police radar warning receiver of claim 22 wherein said tunable microwave oscillator means and said microwave mixer means are each mounted to said top wall of said oscillator section and said mixer section, respectively.

24. The police radar warning receiver of claim 23 wherein said structure is a unitary, integral metal structure.

25. The police radar warning receiver of claim 14 wherein said oscillator section first pair of wall inner cavity-facing surfaces are substantially parallel and said oscillator section second pair of wall inner cavity-facing surfaces are substantially parallel;
end wall means disposed between said oscillator and mixer cavities and substantially perpendicular to the inner cavity-facing surfaces of said oscillator section walls for passing only a portion of said local microwave oscillator signal from said oscillator cavity into said mixer cavity whereby microwave oscillation can be maintained in said oscillator cavity;
said tunable microwave oscillator means including a first semiconductor device mounted within said oscillator cavity, said first semiconductor device having a central axis equidistant from both said inner cavity-facing surfaces of said second pair of oscillator section walls and spaced rearwardly of said end wall means a predetermined distance L.

26. The police radar warning receiver of claim 25, said first semiconductor device having at least one terminal electrically contacting said bottom wall, the police radar warning receiver further including:
a circuit board overlying at least a portion of said oscillator section top wall;
cantilever means formed integral with said circuit board, said cantilever means adapted to bear downwardly toward said first semiconductor device, for maintaining said terminal in electrical contact with said bottom wall.

27. The police radar warning receiver of claim 28 wherein said first semiconductor device is a Gunn diode.

28. The police radar warning receiver of claim 25 wherein said inner cavity-facing surfaces of said second pair of oscillator section walls are spaced apart a predetermined distance W as determined by the formula:

$$f_o = C\left[\frac{\sqrt{W^2 + L^2}}{2WL}\right]$$

wherein C=velocity of light; L>W; and $f_o$ is in the approximate range of twelve GHz to twelve and one-half GHz and said local microwave oscillator signal is at a frequency of approximately 11.55 GHz when said tunable microwave oscillator means is tuned.

29. The police radar warning receiver of claim 28 wherein L is in the approximate range of seven-tenth inch to eight-tenth inch.

30. The police radar warning receiver of claim 29 wherein W is approximately five-eighth inch.

31. The police radar warning receiver of claim 28 wherein L is approximately three-quarter inch.

32. The police radar warning receiver of claim 31 wherein W is approximately five-eighth inch.

33. The police radar warning receiver of claim 32 wherein said inner cavity-facing surfaces are substantially smooth and flat.

34. The police radar warning receiver of claim 28 wherein W is approximately five-eighth inch.

35. The police radar warning receiver of claim 14 further comprising end wall means disposed between said oscillator and mixer cavities for passing a portion of said local microwave oscillator signal from said oscillator cavity into said mixer cavity;
said microwave mixer means including a semiconductor device having a central axis and mounted within said mixer cavity, said semiconductor device central axis lying along a mixing plane being spaced forwardly of and substantially parallel to said end wall means; and
said horn section terminating at its forwardmost end in an aperture adapted to receive police microwave radar signals, said aperture being spaced forwardly of said mixing plane.

36. The police radar warning receiver of claim 35 wherein said semiconductor device is a mixer diode.

37. The police radar warning receiver of claim 35, said semiconductor device having at least one terminal electrically contacting said bottom wall, the police radar warning receiver further including:
a circuit board overlying at least a portion of said mixer section top wall;
cantilever means formed integral with said circuit board, said cantilever means adapted to bear downwardly toward said semiconductor device, for maintaining said terminal in electrical contact with said bottom wall.

38. The police radar warning receiver of claim 35 further comprising:
microwave impedance transformation means mounted within said horn and mixer sections and mounted to at least a portion of said inner cavity-facing surfaces of said top and bottom mixer and horn section walls for providing a substantially smooth impedance transformation from a free-space impedance of a plane wave at said horn aperture to a propagation mode impedance at said mixing plane, said propagation mode impedance being less than said free-space impedance.

39. The police radar warning receiver of claim 38, said semiconductor device having at least one terminal electrically contacting said bottom wall, the police radar warning receiver further including:
a circuit board overlying at least a portion of said mixer section top wall;
cantilever means formed integral with said circuit board, said cantilever means adapted to bear downwardly toward said semiconductor device, for maintaining said terminal in electrical contact with said bottom wall.

40. The police radar warning receiver of claim 38 wherein said microwave impedance transformation means comprises a pair of spaced apart confronting ridges to define a gap therebetween, each said ridge being integral with and projecting inwardly from its associated top or bottom wall, said ridges having a lengthwise central axis being located approximately equidistant from said second pair of wall inner cavity-facing surfaces of said horn and mixer sections.

41. The police radar warning receiver of claim 40 wherein said confronting ridges are each slightly wider than one-eighth inch.

42. The police radar warning receiver of claim 40 wherein said semiconductor device is a mixer diode.

43. The police radar warning receiver of claim 40 wherein said horn aperture is substantially parallel to, and approximately two inches forward of, said mixing plane.

44. The police radar warning receiver of claim 43 wherein said gap is approximately five-hundredth inch at said mixing plane and wherein said gap increases continuously to form a log taper wherein said gap is greater than about four-tenth inch at about one and three-tenth inch forwardly of said mixing plane.

45. The police radar warning receiver of claim 28 wherein said tunable microwave oscillator means further includes microwave tuner means projecting into said oscillator cavity, the extent of said projection being adjustable, for tuning said tunable microwave oscillator means, said microwave tuner means having a central axis spaced (a) rearwardly of said end wall means a predetermined distance $T_1$ and (b) a predetermined distance $T_2$ away from a selected one of said inner cavity-facing surfaces of said second pair of oscillator section walls wherein $T_1$ is in the approximate range of $L/2$ inch to $L$ inch and $T_2$ is approximately $W/2$ inch.

46. The police radar warning receiver of claim 45 wherein L is in the approximate range of seven tenth inch to eight-tenth inch.

47. The police radar warning receiver of claim 46 wherein W is approximately five-eighth inch.

48. The police radar warning receiver of claim 45 wherein L is approximately three-quarter inch.

49. The police radar warning receiver of claim 48 wherein W is approximately five-eighth inch.

50. The police radar warning receiver of claim 45 wherein $T_1$ is in the approximate range of 0.42 inch to 0.48 inch.

51. The police radar warning receiver of claim 50 wherein L is approximately three-quarter inch.

52. The police radar warning receiver of claim 51 wherein W is approximately five-eighth inch.

53. The police radar warning receiver of claim 45 wherein $T_1$ is approximately 0.45 inch.

54. The police radar warning receiver of claim 53 wherein L is approximately three-quarter inch.

55. The police radar warning receiver of claim 54 wherein W is approximately five-eighth inch.

56. The police radar warning receiver of claim 45 wherein said microwave tuner means includes a rod-shaped member.

57. The police radar warning receiver of claim 56 wherein said rod-shaped member is threadably received in a wall of said oscillator section.

58. The police radar warning receiver of claim 56 wherein said rod-shaped member is comprised of alumina.

59. The police radar warning receiver of claim 45 wherein said inner cavity-facing surfaces are substantially smooth and flat.

60. The police radar warning receiver of claim 45 wherein said first semiconductor device is a Gunn diode.

61. The police radar warning receiver of claim 45 wherein said end wall means includes an iris having a predetermined width WI and a predetermined height HI, said iris being centered in said end wall means;
said tunable microwave oscillator means further comprising a second semiconductor device mounted within said oscillator cavity, said second semiconductor device having a central axis spaced rearwardly a predetermined distance $V_1$ from said end wall means and spaced from a selected one of said inner surfaces of said second pair of oscillator section walls a predetermined distance $V_2$ as determined by the equation $$K = \sin^2\left(\frac{V_1 \pi}{L}\right) \sin^2\left(\frac{V_2 \pi}{W}\right)$$

wherein

K is a constant having a value in the approximate range of 0.11 to 0.27;

$V_1 < T_1$; and $$V_2 < \left(\frac{W}{2} - \frac{WI}{2}\right).$$

62. The police radar warning receiver of claim 61 wherein L is in the approximate range of seven-tenth inch to eight-tenth inch.

63. The police radar warning receiver of claim 62 wherein W is approximately five-eighth inch.

64. The police radar warning receiver of claim 61 wherein $V_1$ is less than approximately four-tenth inch.

65. The police radar warning receiver of claim 61 wherein $V_1$ is approximately one-quarter inch.

66. The police radar warning receiver of claim 65, wherein L is approximately three-quarter inch.

67. The police radar warning receiver of claim 66, wherein $T_1$ is in the approximate range of 0.42 inch to 0.48 inch.

68. The police radar warning receiver of claim 61 wherein $V_2$ is less than about 0.15 inch.

69. The police radar warning receiver of claim 61 wherein $V_2$ is approximately one-tenth inch.

70. The police radar warning receiver of claim 69, wherein L is approximately three-quarter inch.

71. The police radar warning receiver of claim 70, wherein $T_1$ is in the approximate range of 0.42 inch to 0.48 inch.

72. The police radar warning receiver of claim 61 wherein said first semiconductor device is a Gunn diode.

73. The police radar warning receiver of claim 72 wherein said second semiconductor device is a varactor diode.

74. The police radar warning receiver of claim 61 wherein said second semiconductor device is a varactor diode.

75. The police radar warning receiver of claim 61, said second semiconductor device having at least one terminal electrically contacting said bottom wall, the police radar warning receiver further including:
 a circuit board overlying at least a portion of said oscillator section top wall;
 cantilever means formed integral with said circuit board, said cantilever means adapted to bear downwardly toward said second semiconductor device, for maintaining said terminal in electrical contact with said bottom wall.

76. The police radar warning receiver of claim 61, said first semiconductor device having at least a first terminal electrically contacting said bottom wall, said second semiconductor having at least a second terminal electrically contacting said bottom wall, the police radar warning receiver further including:
 a circuit board overlying at least a portion of said oscillator section top wall;
 first cantilever means formed integral with said circuit board, said first cantilever means adapted to bear downwardly toward said first semiconductor device, for maintaining said first terminal in electrical contact with said bottom wall; and
 second cantilever means formed integral with said circuit board, said second cantilever means adapted to bear downwardly toward said second semiconductor device, for maintaining said second terminal in electrical contact with said bottom wall.

77. A radar warning receiver, comprising:
 a microwave antenna adapted to receive a microwave radar signal, said antenna comprising an electrically conductive structure dimensioned and shaped to receive microwave signals, said structure having a bottom wall, a rearwardly positioned microwave oscillator section, a forwardly positioned microwave horn section, and a microwave mixer section disposed therebetween, each said section having a first pair of confronting, spaced apart walls, one being a top wall the other being a portion of said bottom wall, and a second pair of confronting, spaced apart left and right walls perpendicular to said first pair of walls to define respective microwave oscillator, horn and mixer cavities, each said wall having an inner cavity-facing surface and an outer surface;
 operating circuitry including tunable microwave oscillator means and microwave mixer means mounted to one said wall of said oscillator section and said mixer section, respectively, said tunable microwave oscillator means projecting into said oscillator cavity for generating a local microwave oscillator signal, said microwave mixer means projecting into said mixer cavity for mixing a received microwave radar signal with said local microwave oscillator signal to produce an output signal; and
 a multi-sided housing enclosing said operating circuitry and said right, left and top walls of said antenna, said housing including a lateral extension having a substantially flat outer surface defining a first plane, said antenna bottom wall outer surface being substantially flat and lying in said first plane.

78. The police radar warning receiver of claim 77 further comprising a circuit board overlying at least a portion of the mixer section wall to which said microwave mixer means is mounted, cantilever means formed integral with said circuit board, said cantilever means adapted to bear towards said mixer section wall to which said microwave mixer means is mounted, for maintaining at least a portion of said microwave mixer means mounted to said mixer section wall.

79. The police radar warning receiver of claim 77 further comprising a circuit board overlying at least a portion of the oscillator section wall to which said tunable microwave oscillator means is mounted, cantilever means formed integral with said circuit board, said cantilever means adapted to bear towards said oscillator section wall to which said tunable microwave oscillator means is mounted, for maintaining at least a portion of said tunable microwave oscillator means mounted to said oscillator section wall.

80. The radar warning receiver of claim 77 wherein said lateral extension is integral with at least a portion of said bottom wall.

81. The radar warning receiver of claim 80 wherein said tunable microwave oscillator means and said microwave mixer means each are mounted to said top wall of said oscillator section and said mixer section, respectively.

82. The radar warning receiver of claim 81 wherein said inner cavity-facing surfaces are substantially smooth and flat.

83. The police radar warning receiver of claim 81 further comprising a circuit board overlying at least a portion of the mixer section top wall, cantilever means formed integral with said circuit board, said cantilever means adapted to bear towards said mixer section top wall for maintaining at least a portion of said microwave mixer means to said mixer section top wall.

84. The police radar warning receiver of claim 81 further comprising a circuit board overlying at least a portion of the oscillator section top wall, cantilever means formed integral with said circuit board, said cantilever means adapted to bear towards said oscillator section top wall for maintaining at least a portion of said tunable microwave oscillator means mounted to said oscillator section top wall.

85. The radar warning receiver of claim 81 wherein said structure is a unitary, integral metal structure.

86. A radar warning receiver, comprising:
 a microwave antenna having top, bottom and side walls to define at least one microwave cavity, said antenna adapted to receive a radar signal, and said bottom wall having a substantially flat outer surface portion defining a first plane;
 a housing enclosing said antenna top and side walls, said housing having a substantially flat top housing wall positioned above said antenna top wall, said housing having a bottom housing wall (a) confronting said top housing wall, (b) integral with said antenna bottom wall and (c) including a substantially flat outer surface lying substantially in said first plane; and
 operating circuitry electrically coupled to said antenna and mounted solely above said antenna bottom wall and below said top housing wall.

87. The radar warning receiver of claim 86 further comprising:
 a circuit board below said top housing wall and overlying at least a portion of said antenna top wall;
 cantilever means formed integral with said circuit board, said cantilever means adapted to bear downwardly towards said antenna top wall for maintaining at least a portion of said operating circuitry electrically coupled to said antenna.

88. A radar warning receiver, comprising:
a housing of relatively shallow construction and having a substantially flat first wall and a closely spaced substantially parallel, substantially flat second wall;
a microwave antenna adapted to receive a microwave radar signal, said antenna comprising a bottom wall, a portion of which defines said housing first wall, a rearwardly positioned microwave oscillator section, a forwardly positioned microwave horn section, and a microwave mixer section disposed therebetween, each said section having a top wall confronting a portion of said bottom wall and having confronting left and right walls to define respective microwave oscillator, horn and mixer cavities, said horn top wall and confronting bottom wall portion terminating in a horn aperture substantially perpendicular to said bottom wall portion thereat and substantially perpendicular to said first and second housing walls, said horn aperture being forward of said mixer section, the distance between said horn top wall and said bottom wall portion at said aperture being the largest distance as measured substantially perpendicularly between any bottom wall portion and a portion of an associated confronting top wall of said antenna, said second housing wall being proximate said horn top wall at said aperture.

89. The radar warning receiver of claim 88 further comprising operating circuitry electrically coupled to said antenna and mounted within said housing.

90. The radar warning receiver of claim 89 further comprising:
a circuit board below said second wall and overlying at least a portion of one of said antenna section top, left and rights walls;
cantilever means formed integral with said circuit board, said cantilever means adapted to bear towards said one wall for maintaining at least a portion of said operating circuitry electrically coupled to said antenna.

91. The radar warning receiver of claim 89, said operating circuitry comprising tunable microwave oscillator means and microwave mixer means mounted to said top wall of said oscillator section and said mixer section, respectively, said tunable microwave oscillator means projecting into said oscillator cavity for generating a local microwave oscillator signal, said microwave mixer means projecting into said mixer cavity for mixing a received microwave radar signal with said local microwave oscillator signal to produce an output signal.

92. The police radar warning receiver of claim 91 further comprising a circuit board overlying at least a portion of the oscillator section top wall, cantilever means formed integral with said circuit board, said cantilever means adapted to bear towards said oscillator section top wall for maintaining at least a portion of said tunable microwave oscillator means mounted to said oscillator section top wall.

93. The police radar warning receiver of claim 91 further comprising a circuit board overlying at least a portion of the mixer section top wall, cantilever means formed integral with said circuit board, said cantilever means adapted to bear towards said mixer section top wall for maintaining at least a portion of said microwave mixer means to said mixer section top wall.

94. A microwave apparatus adapted to receive a microwave radar signal, comprising:
a rearwardly located microwave oscillator section, and a forwardly located microwave mixer and horn section, said forwardly located microwave mixer and horn section having bottom, top and a pair of side walls to define a microwave cavity therebetween, notch filter means insertable through at least one of said walls, said notch filter means comprising at least one tuning pin nonadjustably received through said one wall wherein said pin projects into said cavity a predetermined distance toward but spaced from a said wall oppositely disposed said one wall.

95. The microwave apparatus of claim 94 wherein said microwave cavity terminates at a forwardmost horn aperture adapted to receive microwave radar signals, said microwave apparatus including a semiconductor device having a central axis and mounted within said cavity, said semiconductor device central axis lying along a mixing plane spaced forwardly of said oscillator section and substantially parallel to said aperture, said apparatus further including a pair of microwave impedance transformation ridge means mounted to at least a portion of said top and bottom walls and projecting into said microwave cavity for providing a substantially smooth impedance transformation from a free-space impedance of a plane wave at said horn aperture to a propagation mode impedance at said mixing plane, said propagation mode impedance being less than said free-space impedance.

96. The microwave apparatus of claim 95, said semiconductor device having at least one terminal electrically contacting said bottom wall, the microwave apparatus further including:
a circuit board overlying at least a portion of said mixer and horn section top wall;
cantilever means formed integral with said circuit board, said cantilever means adapted to bear downwardly toward said mixer and horn section top wall for maintaining said terminal in electrical contact with said bottom wall.

97. The microwave apparatus of claim 95 wherein each said ridge means is integral with its associated wall and has a lengthwise central axis located approximately equidistant from said pair of side walls, said ridges spaced apart to define a gap.

98. The microwave apparatus of claim 97, said oscillator section including microwave oscillator means for generating a local microwave oscillator signal at a microwave frequency having an image microwave frequency, said notch filter means comprising at least two said tuning pins positioned on respective sides of said lengthwise central axis of said ridges and each nonadjustably inserted through said top wall to a respective predetermined distance towards but spaced from said bottom wall to define a notch filter at (a) said microwave frequency of said local microwave oscillator signal and (b) said image microwave frequency thereof, respectively.

99. The microwave apparatus of claim 98, said semiconductor device having at least one terminal electrically contacting said bottom wall, the microwave apparatus further including:
a circuit board overlying at least a portion of said mixer and horn section top wall;
cantilever means formed integral with said circuit board, said cantilever means adapted to bear downwardly toward said mixer and horn section top wall for maintaining said terminal in electrical contact with said bottom wall.

100. The microwave apparatus of claim 98 wherein said semiconductor device is a mixer diode.

101. An apparatus adapted to receive police microwave radar signals and further adapted to provide an output signal, said apparatus comprising:

an electrically conductive structure dimensioned and shaped to receive microwave signals, said structure having a rearwardly positioned microwave oscillator section, a forwardly positioned microwave horn section, and a microwave mixer section disposed therebetween, each said section having confronting top and bottom walls and confronting left and right walls to define respective microwave oscillator, horn and mixer cavities, said structure being at a first electrical potential;

tunable microwave oscillator means insulatively mounted to said top wall of said oscillator section and projecting into said oscillator cavity for generating local microwave oscillator signals in response to at least a second electrical potential;

microwave mixer means insulatively mounted to said top wall of said mixer section and projecting into said mixer cavity for mixing said police microwave radar signals with said local microwave oscillator signals to produce an output signal;

end wall means disposed between said oscillator and mixer cavities for passing only a portion of said local microwave oscillator signals from said oscillator cavity into said mixer cavity whereby microwave oscillation can be maintained in said oscillator cavity;

at least one of said tunable microwave oscillator means and said microwave mixer means comprising:

a two-terminal semiconductor diode within a respective said section cavity; and selectively insulated choke means insertable through a respective said section top wall, said choke means being DC insulated from said first electric potential;

said choke means having an upper electrical contact post for connecting with said second electric potential and a lower electrical contact mount, one of said diode terminals being insertable into said lower electrical contact mount whereby electrical contact can be made through said upper post to said diode, said diode being brought into electrical contact with said respective section bottom wall through said other diode terminal when said choke means is inserted through said respective top wall;

a circuit board overlying at least a portion of said top walls of said apparatus; and cantilever means formed integral with said circuit board, said cantilever means adapted to bear downwardly against said upper electrical contact post, for maintaining said diode securely between said bottom wall and said choke means whereby said diode maintains electrical contact with said bottom wall and said diode one terminal is maintained in electrical contact with said choke means.

102. The antenna of claim 101, said structure being a unitary, integral metal structure.

* * * * *

UNITED STATES PATENT AND TRADEMARK OFFICE
CERTIFICATE OF CORRECTION

PATENT NO. : 4,613,989

DATED : September 23, 1986

INVENTOR(S) : Fende et al.

It is certified that error appears in the above-identified patent and that said Letters Patent is hereby corrected as shown below:

Front page under "References Cited", "U.S. PATENT DOCUMENTS" add the following:

| | | |
|---|---|---|
| 3,480,836 | 11/1969 | Aronstein |
| 3,588,741 | 6/1971 | Glance |
| 3,659,223 | 4/1972 | Mawhinney |
| 4,058,813 | 11/1977 | Risko |
| 4,418,429 | 11/1983 | Roberts |
| 4,571,593 | 2/1986 | Martinson |

Front page under "References Cited", "FOREIGN PATENT DOCUMENTS" add the following:

| | | |
|---|---|---|
| 21,623 | 2/1980 | Japan |

Column 24, line 31, after "choke means" insert -- at least a portion of a said bottom wall defining one portion of a multi-sided housing adapted to enclose said top, left and right walls --.

UNITED STATES PATENT AND TRADEMARK OFFICE
CERTIFICATE OF CORRECTION

PATENT NO. : 4,613,989         Page 2 of 2
DATED      : September 23, 1986
INVENTOR(S) : Fende et al.

It is certified that error appears in the above-identified patent and that said Letters Patent is hereby corrected as shown below:

Column 2, line 18, delete "section" (second occurrence) and insert -- sections --.

Column 6, line 33, delete "lheight" and insert -- height --.

Column 13, line 2, after "microwave" (second occurrence) insert -- mixer --.

Signed and Sealed this

Twenty-fourth Day of February, 1987

Attest:

DONALD J. QUIGG

*Attesting Officer*     *Commissioner of Patents and Trademarks*